(12) United States Patent
Yamaguchi et al.

(10) Patent No.: US 9,568,125 B2
(45) Date of Patent: Feb. 14, 2017

(54) THREADED JOINT FOR STEEL PIPES

(75) Inventors: Suguru Yamaguchi, Amagasaki (JP);
Keiichi Nakamura, Wakayama (JP);
Masaaki Sugino, Nishinomiya (JP);
Michihiko Iwamoto, Wakayama (JP);
Gabriel Briquet, Aulnoye-Aymeries (FR); Claire Patureau, Valenciennes (FR); Daly Daly, Valenciennes (FR);
Bertrand Maillon, Valenciennes (FR);
Sylvain Beigneux, Valenciennes (FR)

(73) Assignees: NIPPON STEEL & SUMITOMO METAL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 216 days.

(21) Appl. No.: 12/774,909

(22) Filed: May 6, 2010

(65) Prior Publication Data

US 2011/0025051 A1  Feb. 3, 2011

Related U.S. Application Data

(63) Continuation of application No. PCT/JP2008/069295, filed on Oct. 17, 2008.

(51) Int. Cl.
*F16L 15/00*  (2006.01)
*F16L 15/06*  (2006.01)
(Continued)

(52) U.S. Cl.
CPC ............ *F16L 15/004* (2013.01); *E21B 17/042* (2013.01); *E21B 17/08* (2013.01); *F16L 15/06* (2013.01)

(58) Field of Classification Search
CPC ....... F16L 15/004; F16L 15/06; E21B 17/042; E21B 17/08
(Continued)

(56) References Cited

U.S. PATENT DOCUMENTS 2,893,759 A * 7/1959 Blose ............................ 285/334
2,992,019 A * 7/1961 MacArthur ................... 285/110
(Continued)

FOREIGN PATENT DOCUMENTS

DE   44 46 806 C1   5/1996
FR      2818728 A1 * 6/2002  .............. F16L 15/06
(Continued)

*Primary Examiner* — James Hewitt
(74) *Attorney, Agent, or Firm* — Clark & Brody

(57) ABSTRACT

A threaded joint for steel pipes comprising a pin (1) and a box (2). The pin has a male thread (11) and a lip (12) which comprises (i) a sealing surface (13) and (ii) a nose portion (16) provided with a shoulder surface. The box has a female thread (21), a sealing surface (23) and a shoulder surface. The shoulder surface of the pin comprises two distinct adjacent surfaces, main shoulder (14) in the inner side and sub shoulder (15) in the outer side. Correspondingly, the shoulder surface of the box comprises two distinct adjacent surfaces, main shoulder (24) in the inner side and sub shoulder (25) in the outer side. The main shoulder surfaces of the pin and box are disposed such as to prevent a radially inward deformation of the lip end, and the sub shoulder surfaces of pin and box are disposed such as to limit a radially outward deformation of the lip end. The main shoulder of the pin has a greater radial dimension than said sub shoulder of the pin, and at least the main shoulder surface of the pin is in axial abutment with at least the corresponding main shoulder surface of the box.

26 Claims, 6 Drawing Sheets

(51) Int. Cl.
*E21B 17/042* (2006.01)
*E21B 17/08* (2006.01)

(58) Field of Classification Search
USPC .................................. 285/333, 334, 355, 390
See application file for complete search history.

(56) References Cited

U.S. PATENT DOCUMENTS

| | | | |
|---|---|---|---|
| 3,359,013 | A | 12/1967 | Knox et al. |
| 3,489,437 | A | 1/1970 | Duret |
| 3,870,351 | A | 3/1975 | Matsuki |
| 4,473,245 | A | 9/1984 | Raulins et al. |
| 4,494,777 | A | 1/1985 | Duret |
| 4,611,838 | A | 9/1986 | Heilmann et al. |
| 4,750,761 | A | 6/1988 | Watts |
| 4,984,829 | A * | 1/1991 | Saigo et al. .................. 285/334 |
| 5,810,401 | A | 9/1998 | Mosing et al. |
| 6,045,165 | A * | 4/2000 | Sugino et al. ................ 285/333 |
| 6,237,967 | B1 * | 5/2001 | Yamamoto et al. .......... 285/333 |
| 6,478,344 | B2 * | 11/2002 | Pallini et al. ................. 285/333 |
| 6,851,720 | B2 * | 2/2005 | Hayashi et al. ............... 285/13 |
| 2004/0262919 | A1 * | 12/2004 | Dutilleul et al. ............. 285/333 |
| 2005/0248153 | A1 * | 11/2005 | Sugino et al. ................ 285/333 |
| 2006/0016590 | A1 | 1/2006 | Hall et al. |
| 2011/0241340 | A1 * | 10/2011 | Okada et al. ................. 285/333 |

FOREIGN PATENT DOCUMENTS

| | | | |
|---|---|---|---|
| GB | 1587836 | 4/1981 | |
| JP | 59-137694 | 8/1984 | |
| WO | 00/08367 | 2/2000 | |
| WO | 2004/109173 A1 | 12/2004 | |
| WO | WO 2007017082 A1 * | 2/2007 | ............. F16L 15/04 |
| WO | 2009/059778 | 5/2009 | |

\* cited by examiner

THREADED JOINT FOR STEEL PIPES

This application is a continuation of International Patent Application No. PCT/JP2008/069295, filed Oct. 17, 2008.

TECHNICAL FIELD

This invention relates to a threaded joint for use in connecting steel pipes such as oil country tubular goods (OCTG) which include tubing and casing primarily used for the exploration and production of oil wells and gas wells, riser pipes, line pipes, and the like. More particularly, the present invention relates to a threaded joint for steel pipes of the type having a sealing surface and a shoulder surface in addition to a threaded portion and which has excellent sealing properties against internal and external pressure and excellent compression resistance when repeatedly subjected to combined loads.

BACKGROUND ART

Technology used for connecting steel pipes used in equipment of the oil production industry such as oil country tubular goods, riser pipes, and line pipes includes threaded joints. Threaded joints for steel pipes are constituted by a pin having a male thread element provided at the end of a first tubular member and a box which is a female thread element provided at the end of a second tubular member. The joint is tightened by engaging the male thread and the female thread.

Standard threaded joints are prescribed by API (American Petroleum Institute) standards but in recent years, the environments for exploration and production of crude oil and natural gas are becoming more severe. As a result, there is increasing use of high performance special joints referred to as premium joints which are not prescribed by API standards.

In a typical premium joint, in addition to a tapered thread for firmly connecting steel pipes, the pin and the box have sealing surfaces which can form a metal-to-metal seal for providing sealing performance and torque shoulder surfaces for acting as stoppers during tightening (make-up).

In the past, since vertical wells were predominant, it was sufficient for a threaded joint for OCTG to resist the tensile load due to the weight of pipes and to prevent leakage of high pressure fluid passing through it. However, in recent years, wells are becoming deeper, and deviated wells and horizontal wells which bend underground are increasing, and the development of wells in difficult environments such as in the sea or in polar regions is increasing. Therefore, the properties required for threaded joints are becoming more varied and more strict as exemplified by resistance to compression, resistance to bending, ability to seal against external pressure, and ease of use in the field.

As a result, qualification tests for threaded joints are becoming more severe. In the Series A test of recent ISO 13679 standards; alternances of internal pressure and external pressure combined with tension or compression (internal pressure+tension, internal pressure+compression, external pressure+tension, and external pressure+compression) (herein referred to as repeated combined loads) are applied three times. Such severe test conditions were not taken into consideration in the past in the development of threaded joints.

As shown in FIG. 2, a typical premium joint has a structure in which an unthreaded portion 12 referred to as a lip portion is provided at the end of a threaded portion having a tapered male thread 11 provided on a pin 1 which is a male threaded element. A sealing surface 13 for forming a metal-to-metal seal is provided on the outer peripheral surface of the lip portion. A torque shoulder surface 14 is provided on the end surface of the lip portion (and accordingly on the end surface of the pin).

Naturally, a box 2 which is a corresponding female threaded element is provided with a female thread 21, a sealing surface 23, and a shoulder surface 24 at the rear of the box which correspond to or mate with the male thread 11, the sealing surface 13, and the end surface shoulder surface 14, respectively, of the pin 1.

An overlap in the radial direction referred to as interference is provided between the sealing surfaces of the pin and the box. This type of threaded joint is designed so that if the joint is tightened until the shoulder surfaces of the pin and the box contact each other, the sealing surfaces of both members are in intimate contact around their entire periphery and sealing is provided by metal-to-metal contact.

The above-described sealing performance is exhibited to the highest degree when tightening is carried out with a suitable torque in the period from when the shoulders abut until the shoulders begin to undergo plastic deformation (when a normal tightened state occurs).

The shoulder surfaces act not only as stoppers for tightening but also act to bear almost all of a compressive load acting on the joint. Therefore, if the shoulder surfaces are not thick or if the shoulders are not stiff, they cannot withstand a large compressive load.

Prior art for increasing the resistance to external pressure and resistance to compression of a premium joint is described in WO 2004/109173 (Patent Document 1). That threaded joint greatly increases resistance to external pressure by providing a portion which does not contact the box (referred to below as a nose portion) between the shoulder surface and the sealing surface of the end surface of the pin. At the same time, the taper angle of the nose portion is made 0 degrees (a cylindrical surface) or is made smaller than that of the sealing surface. Due to the provision of the nose portion, a decrease in the thickness of the end surface shoulder surface is prevented, and an increase in resistance to compression can be achieved.

However, in the threaded joint described in Patent Document 1, when a high compressive force and external pressure are simultaneously applied, and when a tensile force and internal pressure are subsequently simultaneously applied, it has been found by the inventors that there can be a risk of developing a leak.

WO 00/08367 (Patent Document 2) discloses a threaded joint in which a tight contacting region is provided in two locations of a lip portion, namely, a tight contacting region near the threaded portion is defined as a sealing surface and a tight contacting region near the end surface (shoulder surface) is defined as a protecting portion. The protecting portion which is a second contact region provided in a location close to the end of the lip portion has the object of supplying a first seal to internal pressure (and thus to protect the sealing surface) and to optimize the forces and moments undergone by the lip.

In the threaded joint described in Patent Document 2, the amount of interference of the protecting portion is set to be higher than the amount of interference of the sealing surface (at least 1.15 times and at most 1.3 times) in order to retain a sufficient amount of contact pressure on the protecting portion while a moderate contact pressure is obtained on the sealing surface. In addition, as Patent Document 2 incites to set sufficient distances from the shoulder to the protective portion, from the protective portion to the sealing surface and from the sealing surface to the thread, the lip portion is designed to be extremely long, so a sufficient thickness (radial dimension) of the shoulder surface may not be obtained. As a result, when a high compressive load is applied, the joint may not sufficiently withstand the compressive load, and it is thought that its compressive performance may be inadequate.

DE 4446806 (Patent Document 3) discloses a threaded joint of the same type as disclosed in Patent Document 2.

U.S. Pat. No. 4,473,245 (Patent Document 4) discloses a threaded joint in which a metal-to-metal seal is provided on the exterior of the pipe and a torque shoulder provides an additional metal-to-metal seal. In the threaded joint disclosed in Patent Document 4, however, the thickness of a lip portion is designed to be very thin, so it is difficult to ensure the resistance to high external pressure and high compression.

U.S. Pat. No. 3,489,437 (Patent Document 5) discloses a threaded joint in which a metal-to-metal seal and a shoulder are provided. However, in the threaded joint disclosed in Patent Document 5, the lip portion is designed according to the same rule as a typical premium joint in FIG. 2, so it is not considered to ensure the resistance to high external pressure and high compression.

U.S. Pat. No. 3,870,351 (Patent Document 6) discloses a threaded joint characterized by its shoulder surfaces having a particular profile. In the threaded joint disclosed in Patent Document 6, the shoulder surfaces are rounded profiles (the shoulder surface of one of the pin and box being convex and that of the other being concave), and they function to form a second seal. This structure is intended to equalize the contact between the sealing surfaces of the first seal by suppressing misalignment or the flexure of the lip toward the pipe axis at the time of make-up.

However, in a threaded joint disclosed in Patent Document 6, although equalization of the sealing contact or sealing pressure of the first seal is taken into account, it is out of consideration to use the threaded joint in a situation where a high compression force and high external pressure simultaneously act thereon. As shown in FIG. 7 of this patent document, there is a space between the outer side of the concave shoulder surface of the box and the outer edge of the convex shoulder surface of the pin. In a situation where a high tension force and high external pressure act thereon, the shoulder surfaces of pin and box can separate easily due to the high tensional force and the tip of lip can easily be deformed or be moved towards the outer side (that is, in the direction which expands the diameter). Therefore, in a threaded joint disclosed in Patent Document 6, it is difficult to control and suppress the deformation or movement of the tip of the pin towards the outer side as described above. Furthermore, if the shoulder surface of the pin has a convex profile, the innermost edge part of the shoulder surface of the box which is concave is so thin that the shoulder surface of the box tends to undergo a heavy plastic deformation when a high compression load is applied to the joint.

Patent Document 1: WO 2004/109173
Patent Document 2: WO 00/08367
Patent Document 3: DE 4446806
Patent Document 4: U.S. Pat. No. 4,473,245
Patent Document 5: U.S. Pat. No. 3,489,437
Patent Document 6: U.S. Pat. No. 3,870,351

DISCLOSURE OF INVENTION

The object of this invention is to provide a premium-type threaded joint for steel pipes which solves the problems of the above-described prior art and which has excellent resistance to compression and which can greatly increase overall sealing performance when subjected to repeated combined loads.

As disclosed in Patent Document 1, it is known that resistance to external pressure is greatly improved in a premium-type threaded joint for steel pipes by providing a nose portion which does not contact the box between the sealing surface of the lip portion and the end surface shoulder surface of a pin.

However, when a high torque or a high compressive load acts on the threaded joint having a nose portion, the joint may sometimes develop leaks. The inventors have found after thorough studies that a reason for developing leaks is linked to the long nose portion which is not supported and can move in the radial direction (the direction perpendicular to the joint axis); the shoulder surface at the end surface of the lip portion of the pin thus unstably deforms in this direction, plastic deformation develops due to bending of the entire lip portion, involving a risk for the sealing performance produced by the metal-to-metal contact of the sealing surfaces located near the threads to be impaired. Accordingly, in order to obtain good sealing properties stably against internal and external pressure in a threaded joint for steel pipes having a nose portion, a structure which prevents unstable deformation of the shoulder surface of the lip portion of the pin is necessary. Furthermore, in order to prevent unstable deformation while maintaining torque resistance and good sealing properties against internal and external pressure, a structure which guarantees the length of the pin lip portion and the thickness of the shoulder surface is necessary.

According to the present invention, deformation in the radial direction of the end surface shoulder surface of the pin lip portion can be suppressed by making a main portion of the shoulder surface (referred to below as the main shoulder surface) to have a shape to cope with deformation towards the inner surface and by providing a sub shoulder as a secondary shoulder to cope with deformation towards the outer surface. Namely, the shoulder surface is immobilized so that deformation does not occur towards either the inner surface or the outer surface. In order to maintain good resistance to compression, most of the thickness of the pin shoulder surface is occupied by the main shoulder having a gentle slope with the perpendicular surface of the axial direction of the joint. The sub shoulder receives substantially no compressive load, and it is sufficient for it to stop deformation in the outward radial direction of the end of the pin. Therefore, the thickness of the sub shoulder is preferably as small as possible. Only when high compressive load acts on the threaded joint between the pin and the box, the shoulder surface of the pin is stably supported by the shoulder surface of the box by abutment of both the main shoulders and the sub shoulders, and unstable deformation in the radial direction of the end of the lip portion is prevented, thereby ensuring good resistance to compression.

The present invention is a threaded joint for steel pipes comprising a pin and a box, the pin having a male thread and a lip comprising (i) a sealing surface and (ii) a nose portion provided with a shoulder surface, the box having a female thread, a sealing surface and a shoulder surface, the male thread being interengaged with the female thread, the sealing surface of the pin being in sealing contact with the corresponding sealing surface of the box, the shoulder surface of the pin being arranged at an end face of the pin, the sealing surface of the pin being located on a pipe end side near the male thread, the nose portion existing between the sealing surface and the shoulder surface, said nose portion not contacting a portion of the box facing said the nose portion of the pin, characterized in that the shoulder surface of the pin comprises two distinct adjacent surfaces, main shoulder in the inner side and sub shoulder in the outer side, and in that the corresponding shoulder surface of the box facing the shoulder surface of the pin comprises two distinct adjacent surfaces, main shoulder in the inner side and sub shoulder in the outer side, said main shoulder surfaces of the pin and box being disposed such as to prevent a radially inward deformation of the lip end, said sub shoulder surfaces of pin and box being disposed such as to limit a radially outward deformation of the lip end, said main shoulder of the pin having a greater radial dimension than said sub shoulder of the pin, at least said main shoulder surface of the pin being in axial abutment with at least the corresponding main shoulder surface of the box.

Here, "the shoulder surface of the pin comprises two distinct adjacent surfaces" means that the angles of main shoulder surface and sub shoulder surface with regard to a plane perpendicular to the axis of the threaded joint are distinctly different.

In preferred embodiments of the present invention the main shoulder surface of the pin is a reverse shoulder surface having a negative angle with respect to a plane perpendicular to the joint axis and sub shoulder surface has a positive angle.

"The main shoulder surface of the pin is a reverse shoulder surface having a negative angle with respect to a plane perpendicular to the joint axis" means a shoulder surface having an angle of slope such that the innermost portion of the main shoulder surface is to the rear of the outermost portion (the portion adjoining the sub shoulder surface) in the advancing direction of the pin in tightening the threaded joint. Similarly "sub shoulder surface has a positive angle" means sub shoulder surface having an angle of slope with respect to its reference angle such that the outermost portion of the sub shoulder surface is to the rear of the innermost portion (the portion adjoining the main shoulder surface) in the advancing direction of the pin in tightening the threaded joint. These angles of slope are then in a range between −90 and +90 degrees.

In a preferred embodiment of the present invention, only the main shoulder surface of the pin is in axial abutment with the corresponding main shoulder surface of the box. There is then no substantial tight contact and more preferably no contact at all between sub shoulders of the pin and the box. Sealing performance between sealing surface of the pin and the box is accomplished more effectively.

In another preferred embodiment, at least a part of the nose portion of the pin has an outside peripheral surface which is not in prolongation of the sealing surface of the pin. "At least a part of the nose portion has an outside peripheral surface which is not in prolongation of the sealing surface" means that the shape of the outside surface of a part or the whole of the nose portion is substantially different from that of the sealing surface.

Said part of the nose portion having a different shape from the sealing surface is preferably a region extending for at least half the length in the axial direction of the nose portion and is thus named a main part of the nose portion. For example, said (main) part of the nose portion can be a cylindrical surface which is not sloped with respect to the axial direction, or it can be a tapered surface with a small angle of slope. A region which is the remainder of the nose portion is preferably a region shorter than half the axial length, and it may have the same shape as the sealing surface (namely, it may be an extension of the sealing surface).

In other preferred embodiments, the absolute value of the angle of the main shoulder surfaces of the pin and the box is from 5 to 25 degrees with respect to a plane perpendicular to the joint axis (namely, the angle of the main shoulder surface of the pin is in the range from −5 to −25 degrees), and the angle of slope of their sub shoulder surfaces are from 5 to 30 degrees with respect to the joint axis (from +60 to +85 degrees with respect to a plane perpendicular to the joint axis), and the angle of slope of the sealing surfaces of the pin and the box is in the range of 5 to 25 degrees with respect to the joint axis. The angle of slope of the sub shoulder surfaces (with reference to the joint axis) is preferably larger than the angle of slope of the sealing surfaces. As a result, even if the shoulder surface deforms in the axial direction, a decrease in the sealing performance due to deformation of the sealing surface is prevented.

In order to increase resistance to compression, it is advantageous that the thickness (radial dimension) of the shoulder surface at the end of the pin be made as large as possible and that the cross section of the portions closer to the end than the sealing surface (namely, the nose portion) be made as large as possible. To this end, in its main part as defined hereabove, the nose portion preferably has a smaller slope than the slope of the sealing surface and the sub shoulder surface with respect to the joint axis. Specifically, the shape of the outer surface of the main part of the nose portion of the pin can be made a cylindrical surface (with a slope of 0 degrees with respect to the joint axis) or a frusto-conical surface having a slope with respect to the joint axis which is smaller than the slope of the sealing surface or the sub shoulder surface with reference to the same axis.

If the outer surface of the nose portion contacts the inner surface of the box after tightening of the threaded joint, there is a risk for the sealing performance of the joint being damaged. Therefore, in order to prevent this contact with certainty, a gap (radial distance between non contacting surfaces) of at least 0.1 mm is preferably provided between these surfaces in the above-described main region of the nose portion. The inner surface of the box in this region preferably has a shape similar to that of the nose portion of the pin, and the gap between the two is preferably made uniform in the main region.

As aforementioned in the explanation of "at least a part of the nose portion has an outside peripheral surface which is not in prolongation of the sealing surface", a partial surface of the nose portion of the pin adjoining the sealing surface may have the same slope as the sealing surface.

The junction between the sub shoulder surface and the main shoulder surface of the pin preferably forms a rounded apex having a radius of at most 1.5 mm.

The sealing surfaces of the pin and the box may both be a frusto-conical surface, but making one of the sealing surfaces a frusto-conical surface and the other sealing surface a curved surface of rotation (torical surface) having a radius of curvature of at least 20 mm or a combination of a curved surface of rotation and a frusto-conical surface increases the sealing performance of the joint.

The sub shoulder surfaces of both the pin and the box are preferably frusto-conical surfaces. The main shoulder surfaces of both the pin and the box are preferably frusto-conical surfaces, but it is also possible for one to be a projecting curved surface (convex torical surface) and the other to be a recessed curved surface (concave torical surface) or a combination of such curved surfaces with planar surfaces as disclosed in WO 2007/017082. As an alternative, the main shoulder surfaces may have a stepped shape as disclosed in U.S. Pat. No. 4,611,838, such step shape preventing an inward deformation of the pin end.

The thickness (radial dimension) of the main shoulder surface is preferably at least 1.5 times the thickness of the sub shoulder surface.

In a premium-type threaded joint for steel pipes according to the present invention, a nose portion which does not contact the box is provided at the end of the lip portion of a pin, and the shape of the shoulder surfaces of the end surfaces thereof is made a double-shoulder structure having a main shoulder surface and a sub shoulder surface, whereby good compressive performance is obtained. As a result, the sealing performance when a combined load is repeatedly applied is greatly increased, and leaks no longer occur in a Series A test according to ISO 13679 standards.

BRIEF DESCRIPTION OF THE DRAWINGS

FIG. 6(A) is a partial perspective view, FIGS. 6(B)-6(C) are end views, and FIG. 6(D) shows an axial profile of a pin and a box near the end of the pin.

BEST MODE FOR CARRYING OUT THE INVENTION

Figure 1:
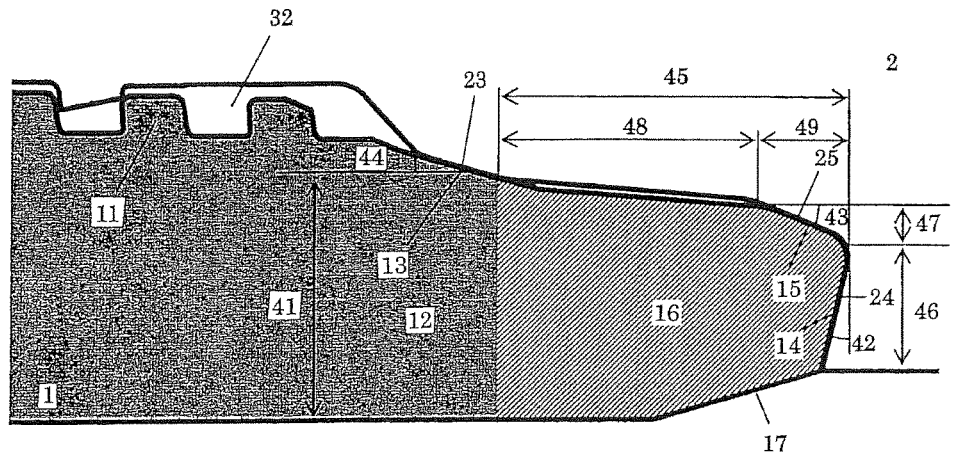
FIG. 1 is a schematic cross-sectional view of the vicinity of the lip portion of a threaded joint for steel pipes according to the present invention in which the main portion of the nose portion is a frusto-conical surface.

Below, a threaded joint for steel pipes according to this invention will be explained while referring to the drawings.

Figure 3:
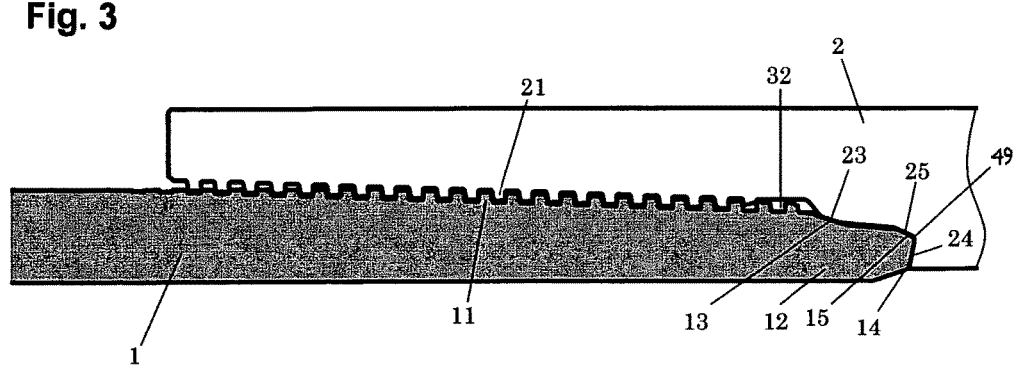
FIG. 3 is a schematic cross-sectional view of a threaded joint for steel pipes according to the present invention.
Figure 4:
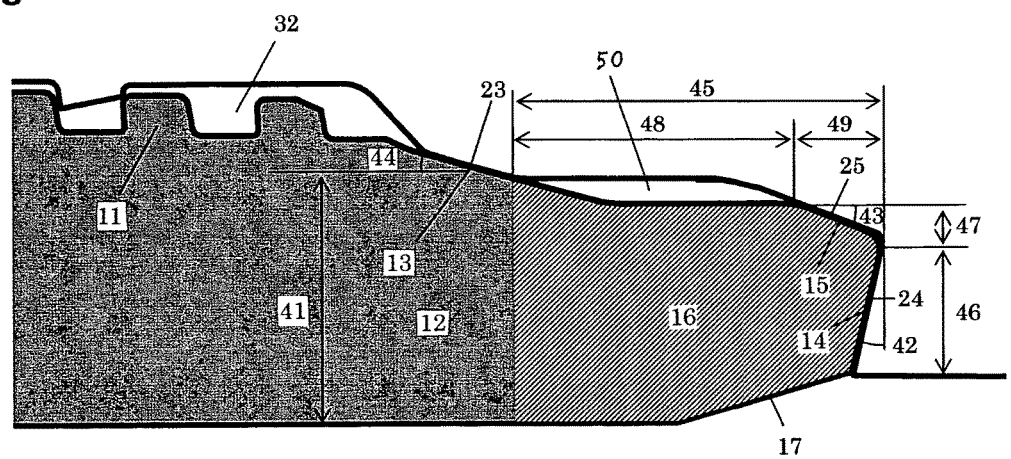
FIG. 4 is a schematic cross-sectional view of the vicinity of the lip portion of a threaded joint for steel pipes according to the present invention in which the main portion of the nose is a cylindrical surface.

FIGS. 1, 3, and 4 are schematic cross-sectional views of a threaded joint for steel pipes according to the present invention. This threaded joint is one type of premium-type threaded joint comprising a pin 1 and a box 2. Accordingly, the pin 1 comprises a threaded portion having a male thread 11, and a lip portion 12 situated on the front end side of the threaded portion and having a sealing surface 13. A shoulder surface is provided on the end surface of the tip of the lip portion. As shown in these figures, the sealing surface 13 of the pin 1 is usually positioned adjoining or in the vicinity of the threaded portion of the lip portion 12. The box 2 has a threaded portion having a female thread 21 which meshes with the male thread 11 of the pin 1, a sealing surface 23 which can sealingly contact the sealing surface 13 of the pin (to achieve a metal-to-metal contact seal), and a shoulder surface which contacts the shoulder surface of the pin in the axial direction of the joint.

Figure 5:
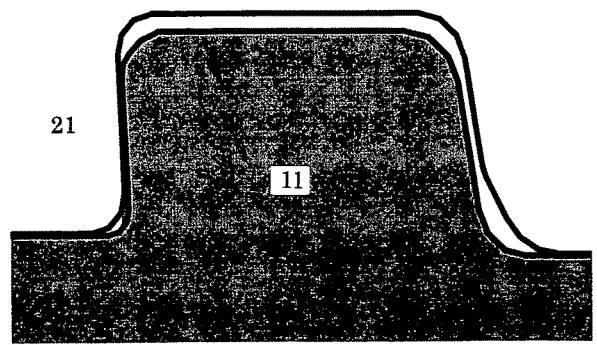
FIG. 5 is a schematic cross-sectional view of the shape of a thread.

As shown in FIG. 5, the male thread 11 of the pin 1 and the female thread 21 of the box 2 are both tapered threads, with the diameter of the thread crest and the thread root gradually decreasing towards the end of the pin. Similarly, the sealing surfaces 13 and 23 of the pin 1 and the box 2 are tapered surfaces which decrease in diameter towards the end of the pin.

A portion of the male thread closer to the tip of the threaded portion of the pin 1 (the side adjoining the lip portion 12) may be a non-engaging thread which does not mesh with the female thread 21 of the box 2. In this case, as shown in the FIG. 3, a circumferential groove 32 is preferably formed in the portion of the box 2 opposing the non-engaging thread of the pin. In this manner, the stiffness of the lip is increased and the resistance of the joint to compression is increased. With the same object, the wall thickness of the pin and the box may be increased towards the shoulder surface (the inner diameter is decreased) by swaging or upsetting.

The lip portion 12 of the pin 1 has a nose portion 16, which is a non-contacting region which does not contact the opposing portion of the box, between the sealing surface 13 and the shoulder surface at its end. Therefore, the length of the lip portion is increased compared to a usual premium joint shown in FIG. 2 which does not have a non-contacting region forward of the sealing surface of the pin.

In the present invention, the end shoulder surface of the pin 1 has a two-level structure comprising a main shoulder surface 14 on the inner surface side of the joint and a sub shoulder surface 15 on the outer surface side of the joint. The thickness 46 (the thickness projected on a plane perpendicular to the joint axis) of the main shoulder surface 14 is larger than the thickness 47 of the sub shoulder surface 15. The main shoulder surface 14 of the pin 1 is a reverse shoulder surface in which the angle 42 with respect to a plane perpendicular to the joint axis is a negative angle. On the other hand, the angle of the sub shoulder surface 15 with respect to a plane perpendicular to the joint axis is positive. Of course, the shoulder surface of the box 2 which contacts the shoulder surfaces 14 and 15 of the pin 1 correspondingly comprises a main shoulder surface 24 on the inner surface side of the joint and a sub shoulder surface 25 on the outer surface side of the joint.

With a usual premium joint, compressive performance of approximately 40 to 60% of the yield strength of the pipe body is demanded, and in some oil wells, compressive performance exceeding 80% is necessary. Of course, a compressive load is borne not only by the shoulders but also by the threaded portions, and if threads having a good ability to bear a compressive load are used, the load on the shoulders can be decreased to that extent. However, the lip portion thickness 41 (the wall thickness of the pin at the middle of the sealing surface 13) is made at least 25% and preferably at least 50% of the wall thickness of the pipe body so that the lip portion will have the resistance to compression demanded of it.

The greater are the thicknesses of the sealing surface and the nose portion of the lip portion, the greater is their ability to seal against external pressure, so when a chamfer 17 is formed on the inner surface of the end of the lip portion in order to prevent turbulence by increasing circularity, the angle of the chamfer 17 with respect to the joint axis is preferably a rather small angle in the range from 9 to 30 degrees. Although this is not the case in FIGS. 1, 3 and 4, a chamfer with a shallow angle may similarly be provided on the inner surface of the box 2 adjoining the pin 1.

The shape of the sealing surfaces 13 and 23 of the pin 1 and the box 2 can be made a straight line which is sloped with respect to the joint axis or a curved line such as a circular arc (the former will be referred to as a frusto-conical surface and the latter will be referred to as a curved surface of rotation), or it can be a surface of rotation formed by rotating a line segment which is a combination of both lines around the joint axis (namely, a combination of a frusto-conical surface and a curved surface of rotation). Preferably, the sealing surface of one of the pin 1 and the box 2 is made a frusto-conical surface, and the sealing surface of the other is a curved surface of rotation or a combination of a curved surface of rotation and a frusto-conical surface. As a result, the sealing performance of the joint is increased, and it becomes difficult for galling to occur.

If the slope 44 (angle of slope) of the sealing surfaces 13 and 23 with respect to the joint axis is too steep, it leads to a decrease in the sealing contact pressure at the time of a tensile load, while if the slope is too gentle, it becomes easier for galling to occur due to an increase in the sliding distance. The slope angle 44 of the sealing surfaces is in the range from 5 to 25 degrees and preferably in the range from 10 to 20 degrees. When tapered threads are employed, the slope angle 44 of the sealing surfaces is larger than the slope angle of the threads 11, 21. For example, the slope angle of the threads is between 1 to 5 degrees and preferably around 1.6 degrees.

If a reverse angle of at least a certain amount is imparted to the main shoulder surfaces 14 and 24 of the pin 1 and the box 2, the deformation of the lip portion when a compressive load is applied becomes uniform spreading in the direction of radially outward, and the sealing performance of the joint increases. However, if the reverse angle is made too large, excessive plastic deformation may occur in the main shoulder surface 24 of the box, thereby impairing the effect of stabilizing deformation and decreasing the sealing performance of the joint. Therefore, the reverse angle 42 of the main shoulder surfaces 14 and 24 is such that the absolute value of the slope 42 of the main shoulder surface 14 of the pin 1 with respect to a plane perpendicular to the joint axis (which is actually a negative angle) is from 5 to 25 degrees and preferably from 10 to 20 degrees.

Figure 9:
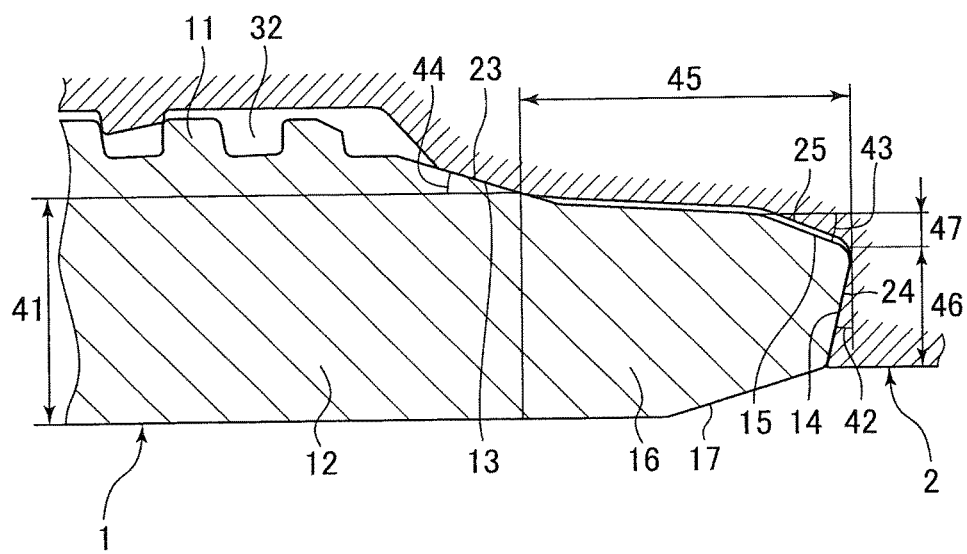
FIG. 9 is a schematic cross sectional view of the vicinity of the lip portion showing a normally tightened state and non-contact between the sub shoulder surfaces of the pin and the box.

The sub shoulder surfaces 15 and 25 of the pin 1 and the box 2 act as stoppers which suppress excessive outwards deformation of the end of the lip portion 12 of the pin 1. Therefore, the sub shoulder surfaces 15 and 25 do not contact each other in a normally tightened state, see FIG. 9. When a high compressive load is acting or an excessive tightening torque is applied, they contact and suppress outward deformation of the lip portion.

The geometric diametric interference (difference in diameter measured at a reference plane before tightening the pin and box) of the sub shoulder surfaces is made at most 1.1 times that of the sealing surfaces, and preferably it is made substantially equal to the geometric diametric interference of the sealing surfaces. The expression "substantially equal" allows a variation up to 5%.

By designing sub shoulder surfaces 15 and 25 of the pin and the box so as to have nearly the same interference as that between the sealing surfaces 13 and 23 in a normal tightened state, the entire lip of the pin will bends inwardly (decrease in diameter) due to the effect of the interference of the sealing surfaces of the pin and the box, and the sub shoulder surface of the pin will bend inwardly by at least the same amount as the interference of sealing surfaces, so contact will not take place between the sub shoulder surfaces of the pin and the box.

However, it is permissible for the sub shoulders 15 and 25 to contact each other in a normal tightened state. In this case, the contact pressure of the sub shoulders is made at most 50% of the contact pressure of the sealing surfaces so as not to have an adverse effect on sealing properties.

The normal tightened state means that the pin and box of a threaded joint are tightened to reach a proper tightening torque which is prescribed by the manufacturer of the joint the according to the shape and material of the joint. In the normal tightened state, the shoulder surfaces (the main shoulder surfaces in the case of a threaded joint according to the present invention) of the pin and the box contact each other with a certain amount of interference without overall yield or extensive plastic deformation.

The slope 43 of the sub shoulder surfaces 15 and 25 with respect to the joint axis is made at least 5 degrees and at most 30 degrees (namely, the slope with respect to the direction perpendicular to the joint axis is at least +60 degrees and at most +85 degrees) and is preferably greater than that of the seal (slope 44) from the standpoints of guaranteeing enough thickness of the main shoulder surfaces 14 and 24 and suppressing deformation of the shoulder surfaces in the direction perpendicular to the joint axis (the radial direction).

Preferably, the sealing surface of the pin, the outside surface of the nose portion of the pin and sub shoulder surface of the pin are not aligned and wherein the sealing surface of the box, the inner surface of the portion of the box facing the outside surface of the nose portion of the pin and the sub shoulder surface of the box are not aligned.

From the standpoints of maintaining resistance to compression and resistance to torque, the thickness of the sub shoulder surface 15 of the pin 1 (the thickness projected on a plane perpendicular to the joint axis) is made smaller than the thickness of the main shoulder surface 14. Preferably, the thickness of the main shoulder surface 14 of the pin 1 is made at least 1.5 times the thickness of the sub shoulder surface 15, more preferably it is made at least 2.5 times and at most 6 times, and still more preferably it is made at least 3 times and at most 5 times.

The length 45 of the nose portion 16 of the pin 1 (namely, the length in the axial direction of the whole nose portion, that is to say, non-contacting region of the pin and the box, including sub shoulder surface region which may be in contact with the box) varies with the size of the threaded joint, but if it is too short, the effect of increasing sealing properties against the external pressure disappears, while if it is too long, the effect of increasing sealing properties saturates. In the range of pipe sizes used in OCTG (an outer diameter of approximately 50 to 550 mm), it is preferably made approximately 4 to 20 mm.

In order to increase the resistance to compression, it is advantageous that the thickness of the shoulder surface of the end of the pin 1 be made as large as possible and that the volume of the portion of the lip portion 12 closer to the end than the sealing surface 13 (namely, the nose portion 16 and the shoulder surface 14, 15) be made as large as possible. To this end, the outer surface of the nose portion is preferably a cylindrical surface (having an angle of slope with respect to the joint axis of 0 degrees) or a frusto-conical surface having a slope with respect to the joint axis which is smaller than the slope of the sealing surface and the sub shoulder over a partial region thereof in the axial direction and preferably over a main region having a length of at least one half of the length in the axial direction. In this case, the inner surface of the portion of the box 2 opposing the nose portion 16 is preferably made a cylindrical surface or a frusto-conical surface (for example with the same slope or a substantially similar slope) like the shape of the nose portion over at least half the length in the axial direction so as to form a uniform gap from the outer surface of the nose portion.

In an embodiment in which the outer surface of the main part of the nose portion 16 is made a frusto-conical surface (namely, a tapered surface) (shown in FIG. 1 and FIG. 3), the inner surface of the box having a frusto-conical shape which opposes the main part of the nose portion functions as a guide, so it becomes possible to perform tightening while centering the lip portion of the pin, whereby the sealing surfaces 13 and 23 of the pin 1 and the box 2 stably contact and the sealing ability is increased, and galling can be prevented. In the case that the outside peripheral surface of nose portion of the pin and the inner surface of the portion of the box opposing nose portion of the pin have a portion having a substantially frusto-conical shape, the taper angle of them is preferably less than 10 degree.

On the other hand, in an embodiment in which the nose portion has a cylindrical surface (FIG. 4), the thickness (46+47) of the shoulder surface and the thickness 41 of the sealing surface 13 can be made as large as possible within a limited pipe wall thickness, so the resistance to compression is increased. Even in an embodiment in which the outer surface of the nose portion is frusto-conical, the thickness of the shoulder surface can be maintained close to that in an embodiment with a cylindrical surface by making it possible for contact to take place at the sub shoulder surface at the time of tightening.

If the outer surface of the nose portion of the pin contacts the inner surface of the opposing surface of the box after tightening, there is the possibility of the sealing ability being impaired. In order to prevent this contact, the gap (radial distance) between the outer surface of the main part of the nose portion of the pin and the inner surface of the opposing portion of the box is preferably at least 0.1 mm in a normal tightened state of the threaded joint. The gap is preferably at most 1.0 mm since a too big gap may cause the inner surface of the box to lose its ability to guide the nose portion of the pin during tightening.

However, as shown in FIG. 4, a partial region of the nose portion 16 adjoining the sealing surface 13 of the pin 1 may have the same slope as the sealing surface 13 (namely, it may become an extension of the sealing surface and have a clearly different shape from the main part of the nose portion 16 (a cylindrical surface in the illustrated example)) and/or a partial region adjoining the sub shoulder surface 25 in the portion of the box 2 opposing the nose portion may have the same slope as the sub shoulder surface 25 (it may become an extension of the sub shoulder surface and have a clearly different shape from the inner surface of the portion of the box facing the main part of the nose portion of the pin). As a result, not only the effect of nose portion but also the good performance of tightening while centering the lip portion of the pin is accomplished. In this case as well, the main part of nose portion 16 clearly has a different shape from the sealing surface 13 and the sub shoulder surface 15 on both sides thereof.

The junction between the main shoulder surface 14 and the sub shoulder surface 15 of the pin 1 forms a rounded apex 49 with a radius of at most 1.5 mm. As a result, the contact area of the main shoulder surface and the sub shoulder surface can be maximized, and an increase in resistance to compression and suppression of deformation in the radial direction of the shoulder surface are achieved.

As discussed earlier, a threaded joint according to the present invention can exhibit a high performance under compression due to a nose portion which is provided near the tip of a lip portion of a pin so as not to contact the opposing surface of a box and due to a two-step shoulder structure having a main shoulder surface and a sub shoulder surface for the shoulder surface at the end of the pin.

However, a greasy lubricant which is a fluid used at the time of make-up of the threaded joint may remain in the space 50 between the pin and the box formed in the area of the nose portion (hereunder, the space will be referred to as nose space). At the completion of make-up, the pressure in the nose space 50 is increased by the lubricant confined in the space, and the increased pressure may cause the contact pressure between the sealing surfaces 13 of the pin and the box to decrease and thus impair the sealing ability of the joint.

In a preferred embodiment of the present invention, the shoulder surface of at least one of the pin and box has at least one groove or bleed concavity extending from the nose space to the inner surface of the threaded joint. Thus, the groove extends across both the main shoulder surface and sub shoulder surface of the pin and/or box. It is possible to locate a portion of the groove on the shoulder surface of the pin and the remaining portion thereof on the shoulder surface of the box. Thus the nose space 50 communicates with the interior space of the threaded joint through the groove. Therefore, when the pressure of the fluid confined in the nose space is increased, it can escape into the interior space of the threaded joint through the groove.

The fluid in the nose space can be allowed to escape by a through-hole extending inside the shoulder portion, but the formation of such a through-hole is rather difficult.

In a particularly preferred embodiment, as shown in FIGS. 6(A)-6(D), at least one groove is provided on the shoulder surface of the pin.

Figure 6A:
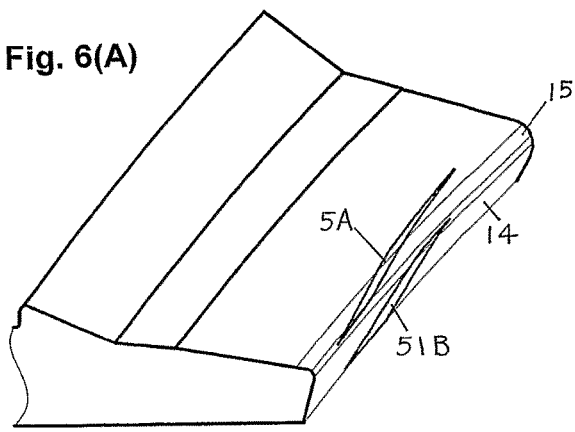
FIGS. 6(A) to 6(D) are schematic diagrams illustrating grooves formed on the shoulder surface of a pin.
Figure 6B:
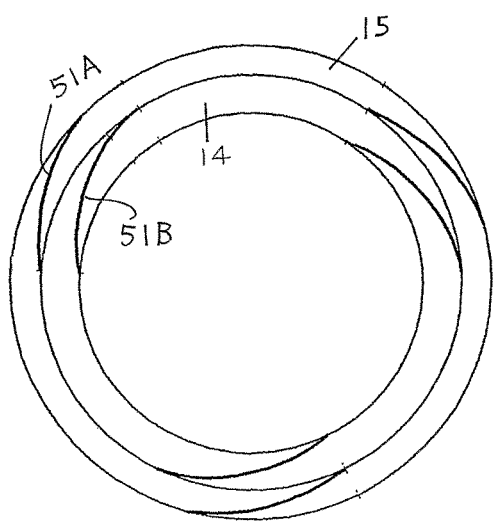

In the case shown in FIG. 6(A), the shoulder surface of the pin which is the end surface of the lip portion has a groove comprising two grooves portions, i.e., a first or outer groove portion 51A and a second or inner groove portion 51B. The outer groove portion 51A extends obliquely across the sub shoulder surface 15, and the inner groove portion 51B extends obliquely across the main shoulder surface 14. FIG. 6(B) shows an end view of the lip portion having three grooves each having two grooves portions 51A, 51B located along the circumference of the lip end.

In order to achieve the above-described function, the groove portions 51A and 51B must communicate with each other. To this end, as shown in FIG. 6(D), along the innermost circumferential portion of the box shoulder which opposes the apex 49 of the pin shoulder (the junction or interface between the main shoulder surface and the sub shoulder surface of the pin), a concavity 52 can be provided as a connecting channel so as to extend from a point opposing the inner end of the outer groove portion 51A to a point opposing the outer end of the inner groove portion 51B, whereby the groove portions 51A, 51B on the pin shoulder communicate with each other through the concavity 52 extending along the circumferential apex 49 on the box shoulder. Alternatively, this connecting channel between groove portions 51A and 51B can be achieved by forming a chamfer or concavity on the surface of the pin shoulder along the circumferential apex 49 so as to extend from the inner end of the outer groove portion 51A to the outer end of the inner groove portion 51B. More preferably, such connecting concavity or channel can be formed on both the pin shoulder surface and the box shoulder surface.

Figure 6C:
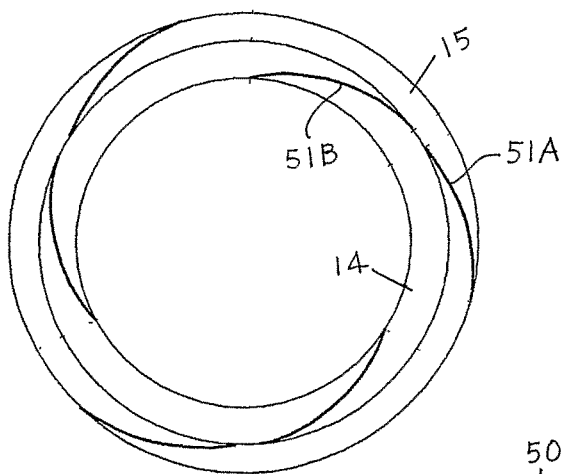
Figure 6D:
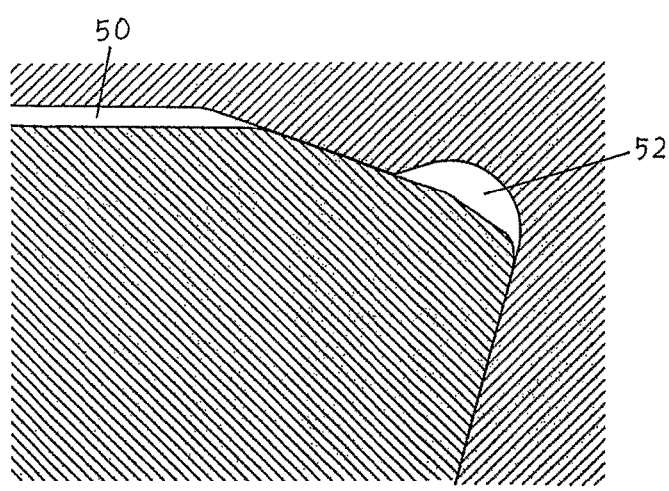
Figure 7:
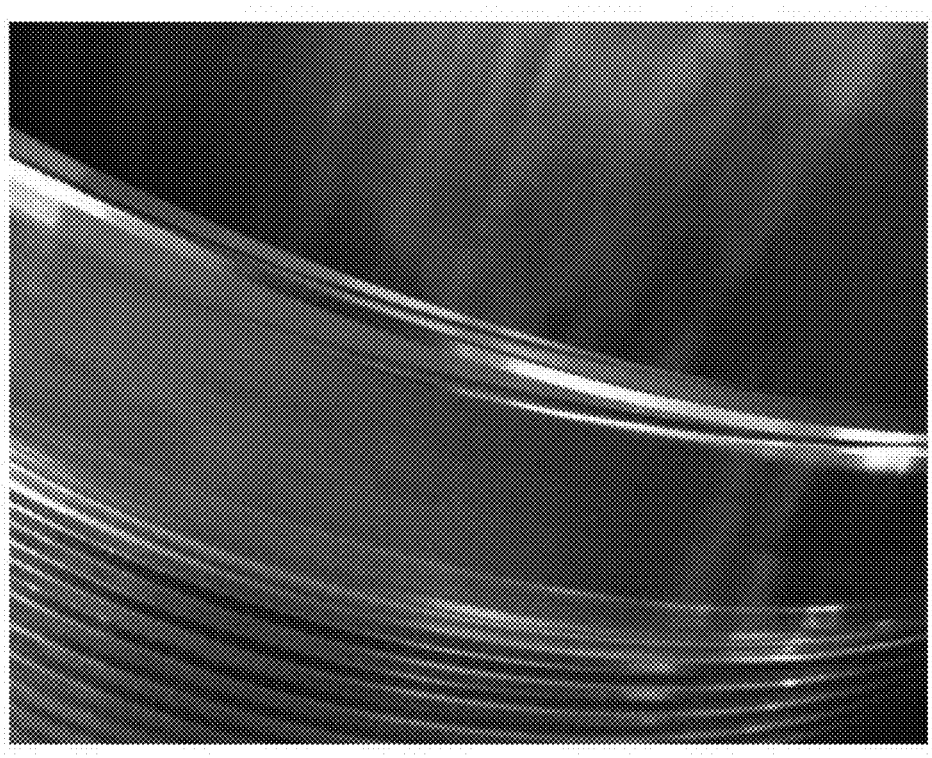
FIGS. 7 and 8 show grooves formed on the shoulder surface of a pin.
Figure 8:
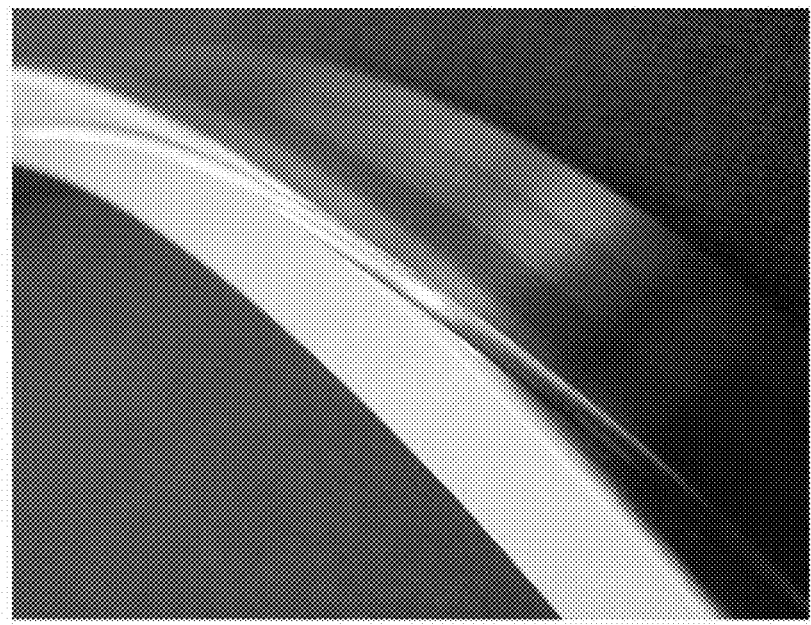

As shown in FIG. 6(C), the outer groove portion 51A and the inner groove portion 51B may be positioned such that they directly communicate with each other (namely, the inner end of the outer groove portion 51A is connected to the outer end of the inner groove portion 51B). FIG. 8 shows a photographic illustration of the shoulder portion of a pin end having an outer and an inner groove portion directly connected to each other. This arrangement dispenses with the formation of a connecting channel as described above, although grooving (formation of grooves) is somewhat easier when the outer and inner groove portions are located in the same circumferential positions as shown in FIG. 6(A). In either case, forming grooves or bleed concavities can be performed using an NC (numerical control) machining system.

In another embodiment, the outer groove portion 51A on the sub shoulder surface and the inner groove portion 51B on the main shoulder surface can extend in a radial direction rather than in an oblique direction as shown in FIGS. 6(A)-6(C), preferably such that these two radially-extending groove portions are directly connected to each other. In this case, the length of each groove portion is minimized so that fluid can escape easily, and grooves can be formed without an NC machining system. However, a special groove forming machine is necessary.

In the embodiments shown in FIGS. 6(B) and 6(C), three grooves each comprising an outer and an inner groove portion for establishing communication between the nose space and the interior space of the threaded joint are provided at equal distances along the circumference of the shoulder surface at the pin end. There may be at least one such groove, and there is no upper limit on the number of grooves, although eight is enough. Preferably, the pin and/or box shoulder has from two to four such grooves.

The cross-sectional shape of the grooves is not restricted, but they should have a cross-sectional area sufficient to allow fluid to pass therethrough. The depth of the grooves is preferably at least 0.1 mm and more preferably at least 0.2 mm. In order to prevent a significant decrease in performance of the threaded joint under compression due to a decrease in the contact area of the main shoulder surface caused by the formation of grooves, the circumferential length of each of the inner and outer groove portions is preferably such that each groove extends over at most 180 degrees along the circumference of the shoulder surface. Thus, if three groove portions are provided on each of the main shoulder and sub shoulder as shown in FIG. 6(B) or 6(C), each groove portion preferably extends along an arc with an angle of 180 degrees or less and more preferably with an angle of 120 degrees or less.

The grooves may be formed on the shoulder surface of the box instead of the pin. When a plurality of grooves are provided in the circumferential direction, some of the grooves may be formed on the pin with the remaining groove or grooves on the box. When a groove comprises an outer and an inner groove portion as shown in FIGS. 6(A) to 6(C), it is also possible to form the outer groove portion on the pin and the inner groove portion on the box, or vice versa.

The shape of a threaded joint for steel pipes other than that described above may be the same as that of a conventional threaded joint for steel pipes of the premium joint type.

For example, the male thread 11 and the female thread 21 of the pin 1 and the box 2 of a threaded joint for steel pipes according to this invention may be tapered threads like those of a typical conventional threaded joint for steel pipes (such as a trapezoidal thread specified by an API buttress thread or a thread having trapezoidal shape derived from the API Buttress thread shape). There have been many proposals concerning the shape (for example, the angles of slope of the stabbing flank and the load flank of the thread, the chamfer, the gap between stabbing flanks, the separation between crest surfaces and root portions, and the radius of curvature of rounded portions) of a tapered thread for a threaded joint for steel pipes, and any of these may be employed. For example, although not shown in FIG. 5, a chamfer (a change in level produced by beveling) may be provided in the stabbing flank (the side surface of the thread on the right side in FIG. 5) of one or both of the male thread and the female thread.

In a tapered thread of the male thread 11 and the female thread 12, the crest surface and the root portion of each crest can be made parallel to the taper of the tapered thread, but preferably they are made parallel to the axial direction of the joint. By doing so, problems due to deviations of the stabbing angle at the time of connecting operations in the field can be decreased.

As is well known, threaded joints for steel pipes include coupling types and integral types. In a typical coupling type, a pin is formed on the outer surface of both ends of steel pipes to be connected, and a box is formed on the inner surface of both sides of a coupling, which is a separate member. In an integral type, a pin is formed on the outer surface of one end of a steel pipe, a box is formed on the inner surface of the other end, and steel pipes are connected without using a coupling. The present invention can be applied to either of these two types of threaded joints for steel pipes.

EXAMPLES

In order to illustrate the effects of this invention, a Series A test according to ISO 13679 standards was carried out on the five test pipes shown in Table 1.

Figure 2A:
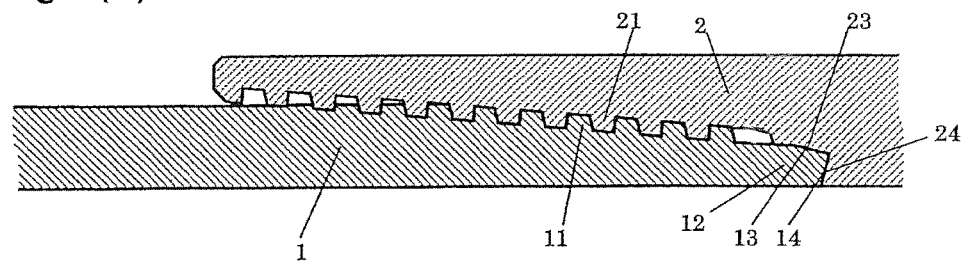
FIG. 2 is a schematic cross-sectional view of a typical premium joint for OCTG of the conventional coupling type, (A) being a partial view showing only one side, and (B) being a view of the entirety.
Figure 2B:
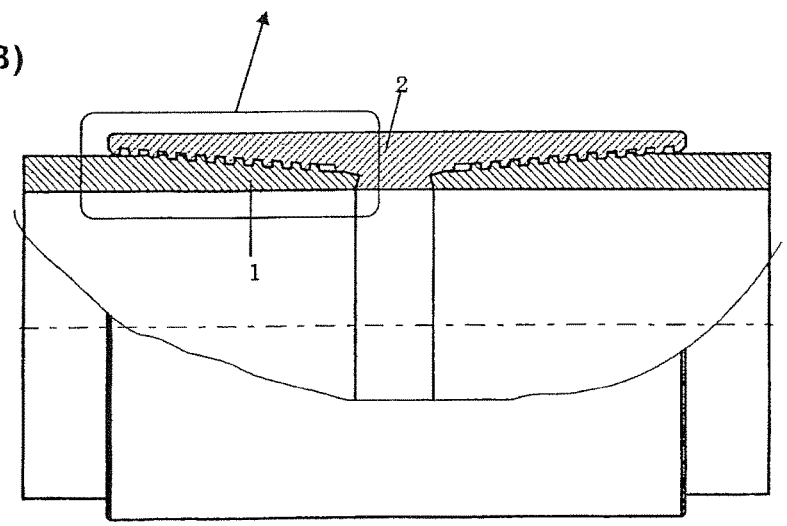

Test pipes #1 to #5 shown in Table 1 have the basic shape of a coupling-type threaded joint (T&C joint) for OCTG shown in FIG. 2. They were three sizes of casing measuring 9⅝ inches, 53.5# (outer diameter of 244.48 mm and wall thickness of 13.84 mm), 10¾ inches, 60.7# (outer diameter of 273.05 mm, wall thickness of 13.84 mm), and 10¾ inches, 65.7# (outer diameter of 273.05 mm, wall thickness of 15.11 mm).

The material of the pipes was an L80 material (carbon steel) of API (American Petroleum Institute) standards. For comparison, #4 was a Q125 material (carbon steel) according to API standards. The length in axial direction of the nose portion 45 of the pin and the length in axial direction of the non-contacting main region 48 of the nose portion are shown in Table 1. The outer surface of the main region of the nose portion and the opposing inner surface of the box were both a frusto-conical surface as shown in FIG. 1 for test pieces #1 to #4 or a cylindrical surface as shown in FIG. 4 for test piece #5. The separation between the pin and the box in the main part of the nose portion was 0.2 mm for test pieces #1 to #4 and 0.9 mm for test piece #5. The angle of chamfered portion 17 is 15 degree for all test pieces. The test results of a Series A test according to ISO 13679 standards are also shown in Table 1.

TABLE 1

| # | Size | Joint material | Angle (°) sealing surface | Angle (°) sub shoulder surface | Angle (°) main shoulder surface | Thickness ratio of shoulder surfaces (main/sub) | length in axial direction of nose portion (mm) non-contacting region 48 | length in axial direction of nose portion (mm) whole nose portion 45 | Test results | Comments |
|---|---|---|---|---|---|---|---|---|---|---|
| 1 | 9-5/8", 53.5# | L80 | 14 | 20 | −15 | 3.7 | 10.2 | 13.5 | Good | This Invention |
| 2 | 10-3/4", 60.7# | L80 | 14 | 20 | −15 | 3.6 | 12.2 | 15.5 | Good | This Invention |
| 3 | 10-3/4", 65.7# | L80 | 14 | 20 | −15 | 4.7 | 6.2 | 9.5 | Good | This Invention |
| 4 | 9-5/8#, 53.5# | Q125 | 14 | 20 | −15 | 3.7 | 10.2 | 13.5 | Good | This Invention |
| 5 | 9-5/8", 53.5# | L80 | 14 | none | 0 | — | 14.0 | 14.0 | Internal pressure leak | Comparative example |

As shown in Table 1, even if the size or material of a joint according to the present invention changed, there was no occurrence of leaks whatsoever, and there was a clear difference in performance compared to a joint outside the scope of the present invention, for which leaks occurred.

The present invention was explained above with respect to a specific embodiment, but this explanation is no more than an example, and the present invention is not limited thereto.

In particular the ones specialized in the art will understand that the present invention may symmetrically apply pin and box with a box sealing surface located on a lip extending at the free end of the box and a box shoulder located at the free end of the box, all features disclosed hereabove being transferred from the pin to the box and vice versa.

The invention claimed is:

1. A threaded joint for steel pipes comprising:
a pin and a box,
the pin having a male thread and a lip comprising:
   (i) a sealing surface; and
   (ii) a nose portion provided with a shoulder surface,
the box having a female thread, a sealing surface and a shoulder surface,
the male thread being interengaged with the female thread,
the sealing surface of the pin being in sealing contact with the corresponding sealing surface of the box, the shoulder surface of the pin being arranged at an end face of the pin, the sealing surface of the pin being located on a pipe end side near the male thread, the nose portion existing between the sealing surface and the shoulder surface, said nose portion not contacting a portion of the box facing said the nose portion of the pin,
wherein the shoulder surface of the pin comprises two distinct adjacent surfaces,
a main shoulder surface on an inner side; and
a sub shoulder surface on an outer side, and
in that the corresponding shoulder surface of the box facing the shoulder surfaces of the pin comprises two distinct adjacent surfaces,
a main shoulder surface on an inner side; and
a sub shoulder surface on an outer side,
said main shoulder surfaces of the pin and box being disposed so as to prevent a radially inward deformation of the lip, said sub shoulder surfaces of the pin and the box being disposed so as to limit a radially outward deformation of the lip, said main shoulder surface of the pin having a greater radial dimension than said sub shoulder surface of the pin, at least said main shoulder surface of the pin being in axial abutment with at least the corresponding main shoulder surface of the box,
wherein at least a part of the nose portion of the pin has an outside peripheral surface which is not in prolongation of the sealing surface of the pin and the sealing surface of the pin, the outside surface of the nose portion of the pin and sub shoulder surface of the pin are not aligned and wherein the sealing surface of the box, the inner surface of the portion of the box facing the outside surface of the nose portion of the pin and the sub shoulder surface of the box are not aligned, and further wherein
the sub shoulder surfaces of the pin and the box do not contact each other in a normal tightened state, where the normal tightened state means that the pin and the box are tightened to reach a proper tightening torque, and
wherein when compared to the normal tightened state, higher compressive load is acting or an excessive tightening torque is applied, the sub shoulder surfaces contact and suppress outward deformation of the lip.

2. A threaded joint according to claim 1, wherein the main shoulder surface of the pin is a reverse shoulder surface having a negative angle with respect to as plane perpendicular to a joint axis.

3. A threaded joint according to claim 1, wherein the sub shoulder surface of the pin has a positive angle with respect to a plane perpendicular to a joint axis.

4. A threaded joint according to claim 1, wherein only the main shoulder surface of the pin is in axial abutment with the corresponding main shoulder surface of the box.

5. A threaded joint according to claim 1, wherein the sub shoulder surface of the pin is designed to interfere with the sub shoulder surface of the box, the geometrical diametric interference between the sub shoulder surfaces of the pin and box being equal to or less than 1.1 times the geometrical diametric interference between the sealing surfaces of the pin and box.

6. A threaded joint according to claim 5, wherein the geometrical diametric interference between the sub shoulder surfaces of the pin and box is substantially equal to the geometrical diametric interference between the sealing surfaces of the pin and box.

7. A threaded joint according to claim 2, wherein the angle of the reverse shoulder with respect to a plane perpendicular to a joint axis is between 5 and 25 degrees.

8. A threaded joint according to claim 1, wherein the shoulder surfaces of the pin and the box are substantially frusta-conical.

9. A threaded joint according to claim 1, wherein the main shoulder surface and the sub shoulder surface of the pin can be supported by the corresponding main shoulder surface and the sub shoulder surface of the box when the main shoulder and sub should surfaces receive compressive load.

10. A threaded joint according to claim 1, wherein the sealing surfaces of the pin and the box are sloping with regard to an axis of the threaded joint at an angle between 5 and 25 degrees.

11. A threaded joint according to claim 1, wherein the sub shoulder surfaces of the pin and the box are sloping with regard to an axis of the threaded joint at an angle between 5 and 30 degrees.

12. A threaded joint according to claim 1, wherein the slope of the sub shoulder surfaces is greater than the slope of the sealing surfaces.

13. A threaded joint according to claim 1, wherein a main part of the nose portion of the pin is in a clearance fit with the facing portion of the box with a minimum clearance fit value of 0.1 mm.

14. A threaded joint according to claim 1, wherein the slope of the sealing surface of the box, the inner surface of the portion of the box facing the outside surface of the nose portion of the pin, and the sub shoulder surface of the box is monotonic.

15. A threaded joint according to claim 1, wherein the pin comprises a rounded apex between the sub shoulder surface and the main shoulder surface, with a radius lower than 1.5 mm.

16. A threaded joint according to claim 1, wherein one of the sealing surface of the pin and of the sealing surface of the box is a frusto-conical surface and the other sealing surface is selected from the group consisting of a torical surface having a radius of curvature larger than 20 mm and a combination of the said torical surface and a frusto-conical surface.

17. A threaded joint according to claim 1, wherein both sub shoulder surfaces of pin and box are frusto-conical surfaces.

18. A threaded joint according to claim 1, wherein a thickness of the main shoulder surface of the pin is at least 1.5 times greater than a thickness of the sub shoulder surface of the pin.

19. A threaded joint according to claim 1, wherein the outside peripheral surface of the nose portion of the pin and the inner surface of the portion of the box facing said the nose portion of the pin have substantially cylindrical shape.

20. A threaded joint according to claim 1, wherein the outside peripheral surface of the nose portion of the pin and the inner surface of the portion of the box facing said the nose portion of the pin have substantially frusto-conical shape, the taper angle is less than 10 degrees.

21. A threaded joint according to claim 1, wherein the shoulder surface of at least one member of the pin and box has at least one groove which extends from the space between the nose portion of the pin and the portion of the box opposing the nose portion to the interior space of the threaded joint.

22. A threaded joint according to claim 21, wherein the groove comprises a first groove portion formed on the sub shoulder surface and a second groove portion formed on the main shoulder surface which directly communicates with the first groove portion at the interface between the sub shoulder surface and the main shoulder surfaces.

23. A threaded joint according to claim 21, wherein the groove comprises a first groove portion formed on the sub shoulder surface and a second groove portion formed on the main shoulder surface which does not directly communicate with the first groove portion at the interface between the sub shoulder surface and the main shoulder surfaces, the second groove portion communicating with the first groove portion through a connecting channel.

24. A threaded joint according to claim 23, wherein the connecting channel is a concavity formed on the shoulder surface of the box.

25. A threaded joint according to claim 23, wherein the connecting channel is a concavity formed on the shoulder surface of the pin.

26. A threaded joint according to claim 24, wherein the concavity is formed by chamfering or grooving.

* * * * *